No. 872,290. PATENTED NOV. 26, 1907.
J. G. LUSK.
TUBE CUTTER.
APPLICATION FILED MAR. 9, 1907.
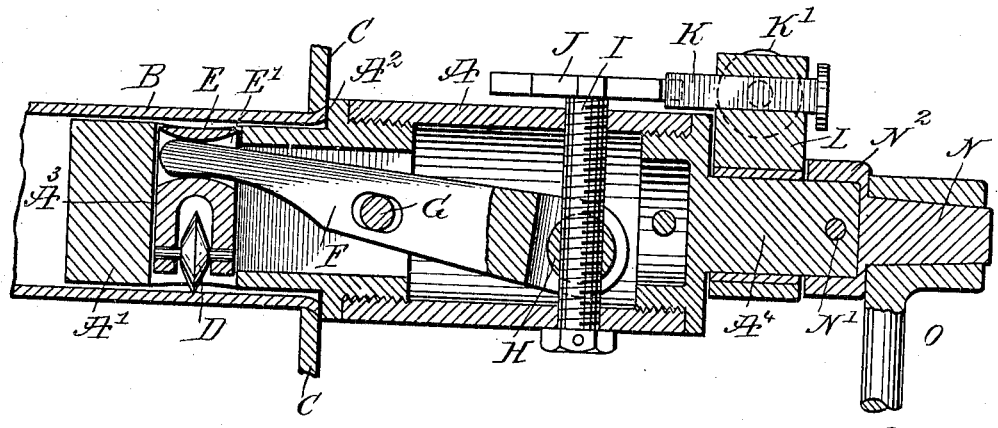
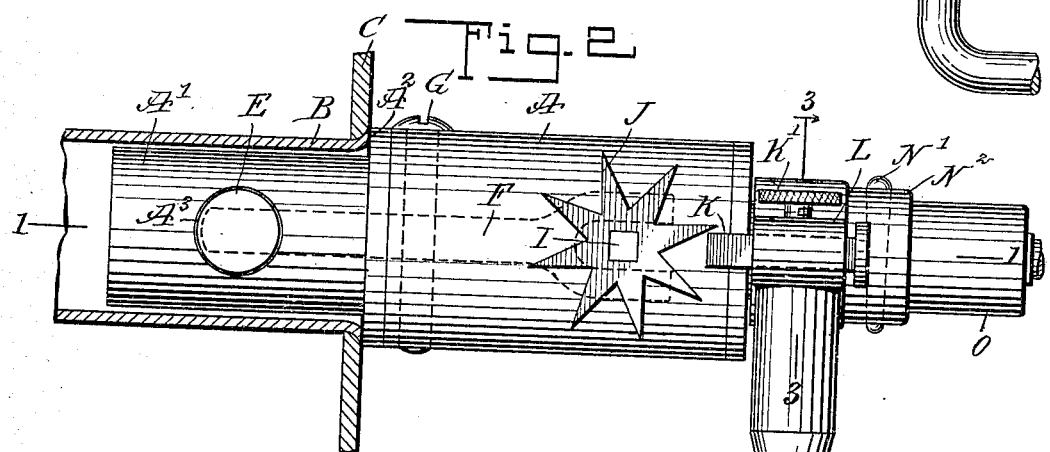
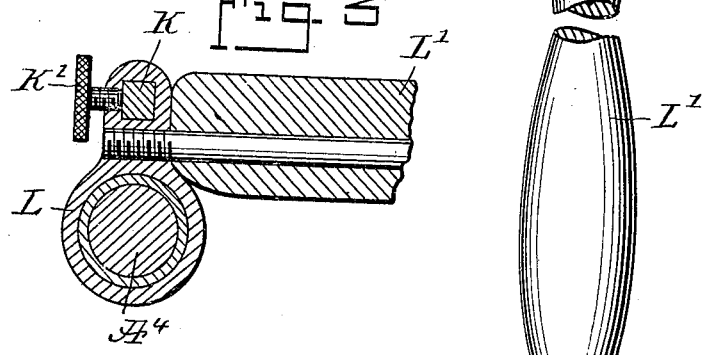
WITNESSES
INVENTOR
James George Lusk
BY
ATTORNEYS

UNITED STATES PATENT OFFICE.

JAMES GEORGE LUSK, OF NEWCASTLE, NEW SOUTH WALES, AUSTRALIA.

TUBE-CUTTER.

No. 872,290.   Specification of Letters Patent.   Patented Nov. 26, 1907

Application filed March 9, 1907. Serial No. 361,598.

*To all whom it may concern:*

Be it known that I, JAMES GEORGE LUSK, a subject of the King of Great Britain, and a resident of Newcastle, in the county of Northumberland, New South Wales, Australia, have invented a new and Improved Tube-Cutter, of which the following is a full, clear, and exact description.

The object of the invention is to provide a new and improved tube cutter, more especially designed for cutting the ends of defective boiler tubes in a very simple, quick and effective manner.

The invention consists of novel features and parts and combinations of the same, which will be more fully described hereinafter and then pointed out in the claims.

A practical embodiment of the invention is represented in the accompanying drawings forming a part of this specification, in which similar characters of reference indicate corresponding parts in all the views.

Figure 1 is a sectional side elevation of the improvement on the line 1—1 of Fig. 2; Fig. 2 is a plan view of the improvement as applied, the boiler tube and head being shown in section, and Fig. 3 is a transverse section of the same on the line 3—3 of Fig. 2.

The casing A of the tube cutter is provided with a reduced end A′ adapted to be passed into the tube B to be cut, the inward movement of the end A′ being limited by the shoulder $A^2$ abutting against the outer face of the boiler head or tube plate C, as plainly indicated in Figs. 1 and 2. The disk cutter D is adapted to cut the boiler tube B a distance inside the boiler head C, and the said cutter D is journaled in a block E mounted to slide transversely in a suitable guideway $A^3$ formed transversely in the reduced end A′ of the casing A. The block E is provided with an opening E′ into which extends one end of a lever F fulcrumed on a pin G secured in the casing A, and the forward end of the lever F is preferably forked, and in the forked members is journaled a nut H in which screws a screw rod I mounted to turn in the casing A and extending diametrically therein, as plainly indicated in the drawings. On one outer end of the screw rod I is secured a star wheel J adapted to engage with its teeth a pin K adjustably secured by a set screw K′ in the head L mounted to turn loosely on the reduced outer end $A^4$ of the casing A. The head L is provided with a handle L′ adapted to be taken hold of by the operator, to hold the head L stationary and the pin K in the path of the teeth of the star wheel J, so that when the casing A is turned the star wheel teeth come successively in contact with the pin K, thus intermittently turning the star wheel J and the screw rod I. When this takes place the nut H is caused to travel on the screw rod I, and consequently a swinging motion is given to the lever F, which by its connection with the block E moves the same outward to engage the cutting edge of the cutter D with the inner surface of the boiler tube B, with a view to cut the same.

The casing A is adapted to be turned by hand or by power and for this purpose the terminal of the reduced end $A^4$ of the casing A is provided with a polygonal head N fastened in place by a pin N′ and extending transversely through the reduced end $A^4$ and through the hub $N^2$ of the head N. The head N is adapted to receive a wrench O or other suitable tool or may be engaged with a socket on the shaft of the motor, so as to turn the casing A by power if desired.

The device is used as follows: Normally the block E is in an innermost position so that the cutter D is withdrawn within the peripheral face of the reduced end A′ of the casing, and when the cutter is in this position the reduced end A′ can be readily pressed into the tube B, as illustrated in Figs. 1 and 2. The casing A is now turned either by hand or by power, as previously mentioned, and in doing so the block E is caused to slide outward so that the disk cutter D makes an annular cut in the tube B, to finally cut the wall of the tube completely, and after this has been done the pin K is moved out of the path of the star wheel J to allow of turning the latter in a reverse direction, so as to move the block E back into its normal position, to allow removal of the device from the boiler for use in another tube, as above explained.

From the foregoing it will be seen that a gradual outward feeding of the cutter D takes place, while the cutter is bodily carried around with the casing A, and consequently a very quick and accurate cutting of the boiler tube B takes place.

The device shown and described is very simple and durable in construction, composed of comparatively few parts and not liable to easily get out of order.

Having thus described my invention, 1 claim as new and desire to secure by Letters Patent:

1. A tube cutter comprising a casing having a reduced end for entering the tube to be cut, a block slidable transversely in the said reduced end, a member engaging said block and fulcrumed in the casing, a nut on the said member, a screw rod mounted to turn in the casing and screwing into the nut, and means whereby the turning of the casing will turn the said screw rod.

2. A tube cutter comprising a casing having a reduced end for entering the tube to be cut, a block slidable transversely in the said reduced end, a lever engaging the said block and fulcrumed in the casing, a nut on the said lever, a screw rod mounted to turn in the casing and screwing in the said nut, and means for turning the said screw rod.

3. A tube cutter comprising a casing having a reduced end for entering the tube to be cut, a block slidable transversely in the said reduced end, a lever engaging the said block and fulcrumed in the casing, a nut on the said lever, a screw rod mounted to turn in the casing and screwing in the said nut, a star wheel held on the said screw rod outside of the said casing, and a pin extending into the path of the teeth of the said star wheel to intermittently rotate the latter on turning the said casing.

4. A tube cutter comprising a casing having a reduced end for entering the tube to be cut, a block slidable transversely in the said reduced end, a lever engaging the said block and fulcrumed in the casing, a nut on the said lever, a screw rod mounted to turn in the casing and screwing in the said nut, a star wheel held on the said screw rod outside of the said casing, a pin extending into the path of the teeth of the said star wheel to intermittently rotate the latter on turning the said casing, and a handle fulcrumed loosely on the said casing and in which the said pin is adjustably secured.

In testimony whereof I have signed my name to this specification in the presence of two subscribing witnesses.

JAMES GEORGE LUSK.

Witnesses:
MICHAEL BARNETT,
GILBERT B. LUSK.